Figure 1:
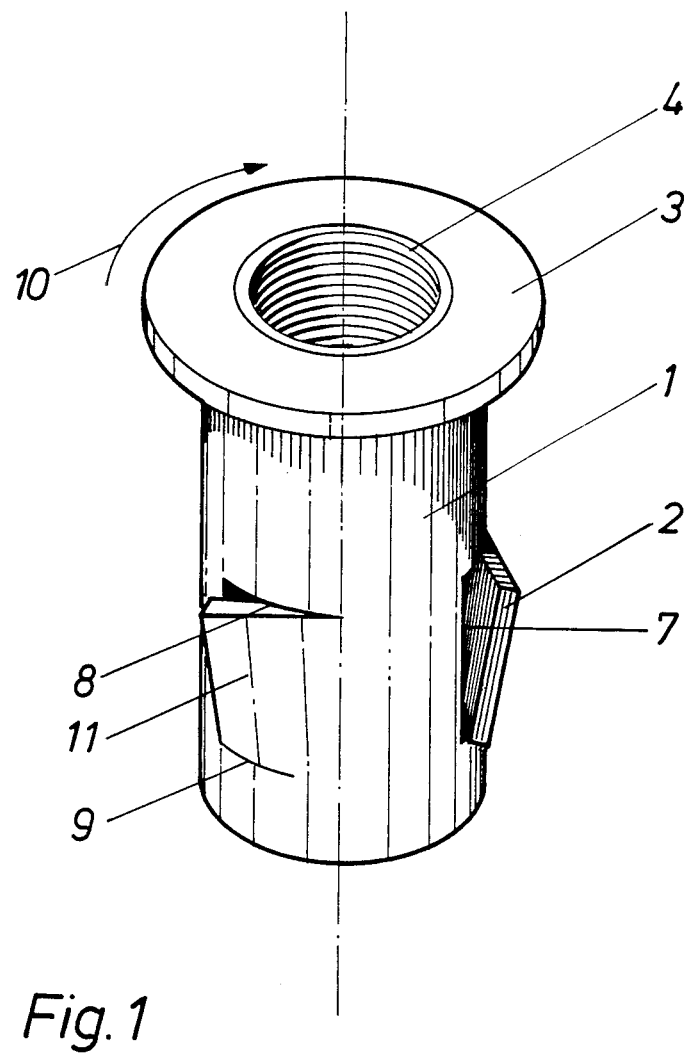

_United States Patent_ [19]

Bredal

[11] Patent Number: 4,749,318
[45] Date of Patent: Jun. 7, 1988

[54] NUT

[75] Inventor: Torben Bredal, Gilleleje, Denmark

[73] Assignee: Aktieselskabet J.H. Holm Holding, Ebberup, Denmark

[21] Appl. No.: 86,211

[22] Filed: Aug. 17, 1987

Related U.S. Application Data

[63] Continuation of Ser. No. 749,199, Jun. 26, 1985, abandoned.

[51] Int. Cl.⁴ .................. F16B 13/12; F16B 37/04
[52] U.S. Cl. .................................... 411/180; 411/508
[58] Field of Search ............ 411/180, 378, 427, 455, 411/451, 173, 82, 81, 258, 59, 74, 148, 166, 61, 178, 520, 521, 103, 107, 71, 72, 73, 433; 248/231.9, 231.91, 546

[56] References Cited

U.S. PATENT DOCUMENTS

| 1,095,366 | 5/1914 | Abbott . | |
|---|---|---|---|
| 1,368,896 | 2/1921 | Chambley | 44/166 X |
| 1,855,482 | 4/1932 | McArthur | 411/455 X |
| 2,240,425 | 4/1941 | Sternbergh | 411/433 |
| 2,244,976 | 6/1941 | Tinnerman | 411/173 |
| 2,582,580 | 1/1952 | Bedford, Jr. | 411/520 |
| 2,667,200 | 1/1954 | Bedford, Jr. | 411/173 |
| 3,160,189 | 12/1964 | Hughes | 411/178 |
| 3,194,107 | 7/1965 | Ballard | 411/74 |
| 3,358,728 | 12/1967 | Hughes | 411/180 |
| 3,668,968 | 6/1972 | Modrey . | |
| 4,325,178 | 4/1982 | Pruehs | 411/180 |

FOREIGN PATENT DOCUMENTS

| 292280 | 8/1971 | Austria . | |
|---|---|---|---|
| 2454022 | 5/1976 | Fed. Rep. of Germany | 44/71 |
| 1444248 | 5/1966 | France . | |
| 425862 | 8/1971 | Sweden . | |
| 679997 | 9/1952 | United Kingdom . | |
| 2006368 | 5/1979 | United Kingdom . | |

_Primary Examiner_—Gary L. Smith
_Assistant Examiner_—Rodney M. Lindsey
_Attorney, Agent, or Firm_—Merchant, Gould, Smith, Edell, Welter & Schmidt

[57] ABSTRACT

A nut intended for being retained in a blind hole is provided with a number of lips (11) extending from the cylindrical part (1) of the nut and forming cutting edges (2) which extend most at the upper corner. When these edges (2) are turned in the direction of rotation (10) of the nut when a bolt (5) is being tightened, they will cut further into the wall of the hole. The result is a downturned force which will contribute to securing the nut in the object, and the bolt (5) will not be capable of loosening because the material (6) will be wedged in between the bolt (5) and the lip (11). If the nut is to be withdrawn from the hole, this is most easily done by turning the nut in the opposite direction at the same time while being drawn out. This will cause no appreciable damage to the material in the rim area of the hole.

4 Claims, 2 Drawing Sheets

NUT

This is a continuation of application Ser. No. 749, 199 filed June 26, 1985, now abandoned.

The invention relates to a nut, especially for fitting in a hole in an object of eg. wood, chip board, plastic or similar semi-hard material or for embedding in plastic, bakelite or similar moulding material which nut is made of rolled up sheet metal and provided with punchings for forming lips bending outwards from the nut, said lips engaging the material when tightening a bolt screwed into the nut.

Nuts of this kind are especially used for assemblies where the nut is to remain hidden in a bore in an object so that the assembly between a bolt and the nut can be separated according to requirements.

The protruding lips extend at the lower section of the nut and protrude forwardly in the screwing in end of the nut for the bolt. When tightening the bolt, the nut is turned in the hole so that the bent out lips cut somewhat into the wall of material and thus anchors the nut.

The bolt can then be screwed out without the nut leaving its position in the hole because of the engagement of the lips in the wall and the resulting friction engagement.

During the tightening, lips of this kind are moved in the screwing in direction of the bolt. Especially during the initial tightening the nut will often be somewhat turned particularly in case where the fit between nut and hole is loose whereby the lips are easily twisted so that they cannot cut into the material when the longitudinal movement of the nut starts. This will of course result in lesser fastening abilities and, moreover, the lips will especially in hard materials easily break off so that the expected anchoring is not obtained.

Finally, a screwed in nut cannot be removed from the object without having to be drawn out with the lips in the material thus damaging the rim area.

It is the object of the invention to remedy these drawbacks by the known nuts and this is achieved by a nut where each lip forms a cutting edge pointing in the direction of tightening of the nut. By tightening a nut with such lips it will be anchored in the material by the cutting in of the lips into the wall of the hole at the same time as the bolt tightens. This cutting edge is pointing in the direction of rotation of the bolt and can therefore not so easily break off just as particularly in hard materials it will more easily be capable of going into frictional engagement therewith because of the abilites of the cutting edge to cut into the wall. This nut may also be drawn out of the hole, for example, by means of an unscrewing stud with a counter nut that may turn the nut and thus the cutting edges clear of the engagement so that the nut may be easily drawn out without damaging the material.

By designing the lips, there is obtained a cutting edge which by being cut into the material provides an anchoring as well as a downwards movement due to the shape of the cutting edge. This edge forms a blade extending most at the top from where it extends inwardly towards the inner and bottom parts of the nut. The downturned force exerted by the pressure of the material on the blade which contributes to the tightening is thereby produced. This will moreover ensure that the bolt in an internal screw thread of the nut is not undesirably screwed out because the pressed in material will be squeezed against the bolt which is thereby retained.

Finally, it is advantageous to form a rim part at the top of the nut so that the nut is fixed in the material by the tightening.

Figure 2:
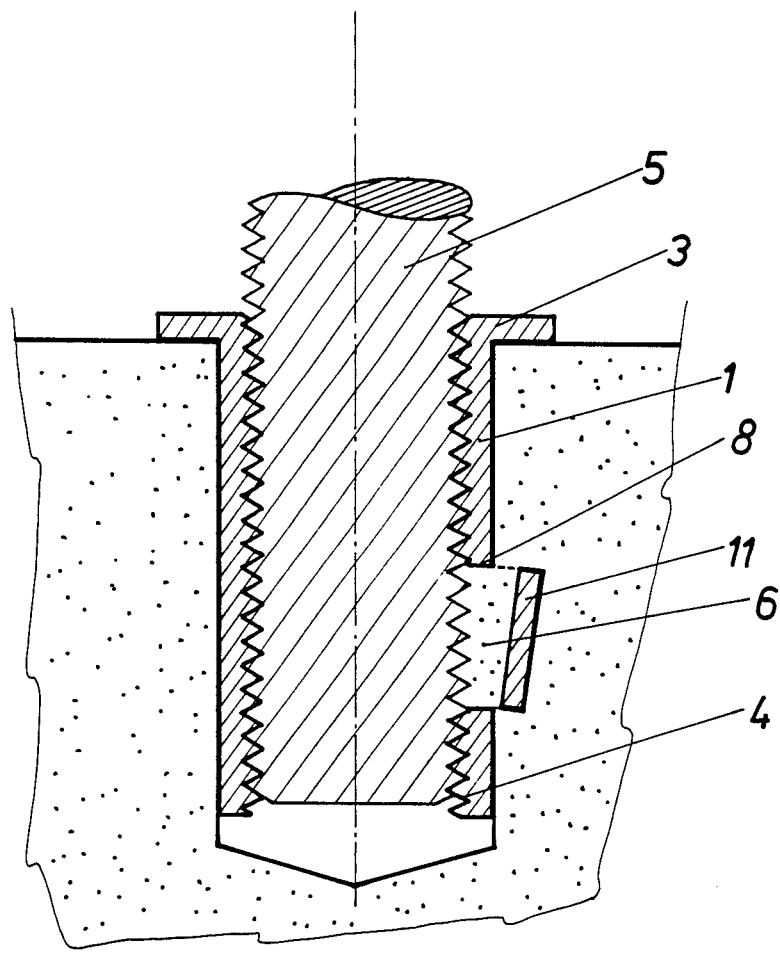

The invention will be further described in the following with reference to the drawing wherein FIG. 1 is a perspective view of the nut, and FIG. 2 is a cross-section of the nut with a bolt screwed in.

The drawing shows a preferred embodiment of the nut comprising a bush 1 made by bending a piece of sheet metal being formed as a hollow cylindrical bush. At the top of the bush there is formed a flange 3 which is substantially at right angles to the longitudinal axis of the bush.

The inside of the bush is provided with a screw thread 4 extending in the entire length thereof. In the side of the bush there are punched three cuts 7, 8, 9 for each lip 11 said cuts being a longitudinal cut 7 determining the height of the lip and two transverse cuts whereof the upper cut 8 is somewhat longer than the lower cut 9. This produces a lip 11 having a cutting edge 2 being shaped as a blade with the pointed end at the upper corner. This shape will provide the preferred cutting edge that will partly cut into the wall of the hole and partly produce a downwards movement of the bush by compression of material across the blade which will force the blade and consequently the nut downwards.

As shown in FIG. 2, the nut has been screwed into a blind hole in an object. After the insertion in the hole a bolt 5 has been introduced into the nut and screwed into same. By the screwing in in the direction of rotation 10, see FIG. 1, the cutting edges 2 have been cut into the material, and this material 6 has been carried towards the bolt 5. This accumulation of material will retain the nut in its screwed in position and thereby prevent an undesired loosening of the bolt and the nut.

If the nut is to be removed from the hole, this may by done by turning same in a direction opposite the direction of screwing in 10 whereby the cutting edges will be withdrawn from the material, and the nut can be easily turned out of the hole. This removal will not damage the wall of the object in the same way as the known nuts.

At the top of the nut there is designed a rim part 3 forming a collar on the nut. This collar will retain the nut against the surface of the object and will by use in chip boards, for example, ensure that the object is not damaged by even a strong tightening. Moreover, the rim part 3 will create a counter-pressure against the downwards stress and so the upwards reaction of material which particularly in connection with chip boards is necessary for avoiding damage of the rim area.

When screwing in the bolt there is thus provided a turning of the nut into a point where the cutting edges have attained the required engagement in the wall of the hole for withstanding the turning moment of the bolt when said bolt has the desired torque moment.

The nut according to the invention will also be suitable for embedding in plastic, bakelite or similar moulding material. Contrary to the known nuts the cutting edges 2 will cause no formation of slots in the surrounding material so that there is obtained a considerably stronger retaining force than previously seen.

A contributory factor is the good distribution of stresses from the nut to the surrounding material. The transfer of force will substantially take place in directions downwards and outwards from the area around the cutting edges into the material where its strongest retaining force is present. The tendency to damages of the upper parts of material is thereby reduced.

I claim:

1. A nut to be received within a hole of predetermined dimensions formed in a receiving material with said hole defined by a wall of said receiving material, said nut comprising:

a hollow cylindrical body (1) extending from a first body end to a second body end;

means for receiving a bolt within said body and urging said body to rotate in a predetermined direction (10) of rotation when said bolt is tightened into said body;

a cutting lip (11) disposed on an outer cylindrical surface of said body (1) between said first and second ends thereof, said lip (11) having a longitudinal cutting edge (2) facing in said direction (10) of rotation, a first end of said edge (2) adjacent said first body end and a second end of said edge (2) adjacent said second body end, both of said first and second ends of said edge spaced from said body with said first end of said edge (2) spaced from said body (1) a distance greater than a spacing of said second end of said edge (2) from said body (1); and said cutting edge (2) disposed to cut into said wall of said receiving material and draw said body into said hole when said body is urged in said direction of rotation.

2. A nut according to claim 1 wherein said cutting lip comprises a portion of said body formed by cooperation of a longitudinal cut (7), first transverse cut (8) and second transverse cut (9) formed in said body, said longitudinal cut (7) made in said body and extending therethrough a length between said first and second ends of said edge (2) with said longitudinal cut (7) exposing said edge (2);

said first transverse cut (8) made through said body and extending from said first end of said edge (2) in a direction away from said direction (10) of rotation;

said second transverse cut (9) made through said body and extending from said second end of said edge (2) in a direction away from said direction (10) of rotation; and said first transverse cut (8) having a length greater than a length of said second transverse cut (9).

3. A nut according to claim 1 wherein said body is provided with a radially outwardly protruding flange (3) at said first end of said body.

4. A nut according to claim 1 wherein said means for receiving a bolt within said body comprises a screw thread formed on an interior surface of said body and formed to receive a threaded bolt, said bolt and thread cooperating to advance said bolt into said body upon turning of said bolt in said predetermined direction.

* * * * *